United States Patent
Emrey

[11] Patent Number: 5,542,500
[45] Date of Patent: Aug. 6, 1996

[54] WORKCAR INSERT

[76] Inventor: David L. Emrey, 1206-L Whilden Pl., Greensboro, N.C. 27408

[21] Appl. No.: 269,523
[22] Filed: Jul. 1, 1994
[51] Int. Cl.⁶ .................................................. B66B 9/04
[52] U.S. Cl. .................................. 187/273; 187/244
[58] Field of Search .................... 187/203, 250, 187/244, 267, 268, 269, 273; 280/79.11, 79.2

[56] References Cited

U.S. PATENT DOCUMENTS

| | | | |
|---|---|---|---|
| 2,610,824 | 9/1952 | Grier | 187/250 X |
| 2,804,118 | 8/1957 | Bayerkohler | 187/250 X |
| 3,908,562 | 9/1975 | Wittschen | 280/79.11 |
| 4,867,277 | 9/1989 | Sloan | 187/269 X |
| 5,119,907 | 6/1992 | Billington, III et al. | 187/273 X |
| 5,299,906 | 4/1994 | Stone | 187/269 X |

FOREIGN PATENT DOCUMENTS

| | | | |
|---|---|---|---|
| 1751132 | 7/1992 | U.S.S.R. | 187/250 X |
| 1003025 | 9/1965 | United Kingdom | 187/203 X |

Primary Examiner—William E. Terrell
Assistant Examiner—Dean A. Reichard

[57] ABSTRACT

A workcart is provided for containing and handling parts or objects which includes a movable platform to assist the user in loading and unloading during use. A pneumatic mechanism controls the platform movement by use of a bellows and allows the platform to vertically adjust in any of a variety of selectable positions by a three-way control valve mounted on the cart. A pneumatic source such as an air compressor is connected to the pneumatic mechanism by a quick connect coupling. The cart may include wheels to allow it to be easily rolled from workstation to workstation as required.

7 Claims, 3 Drawing Sheets

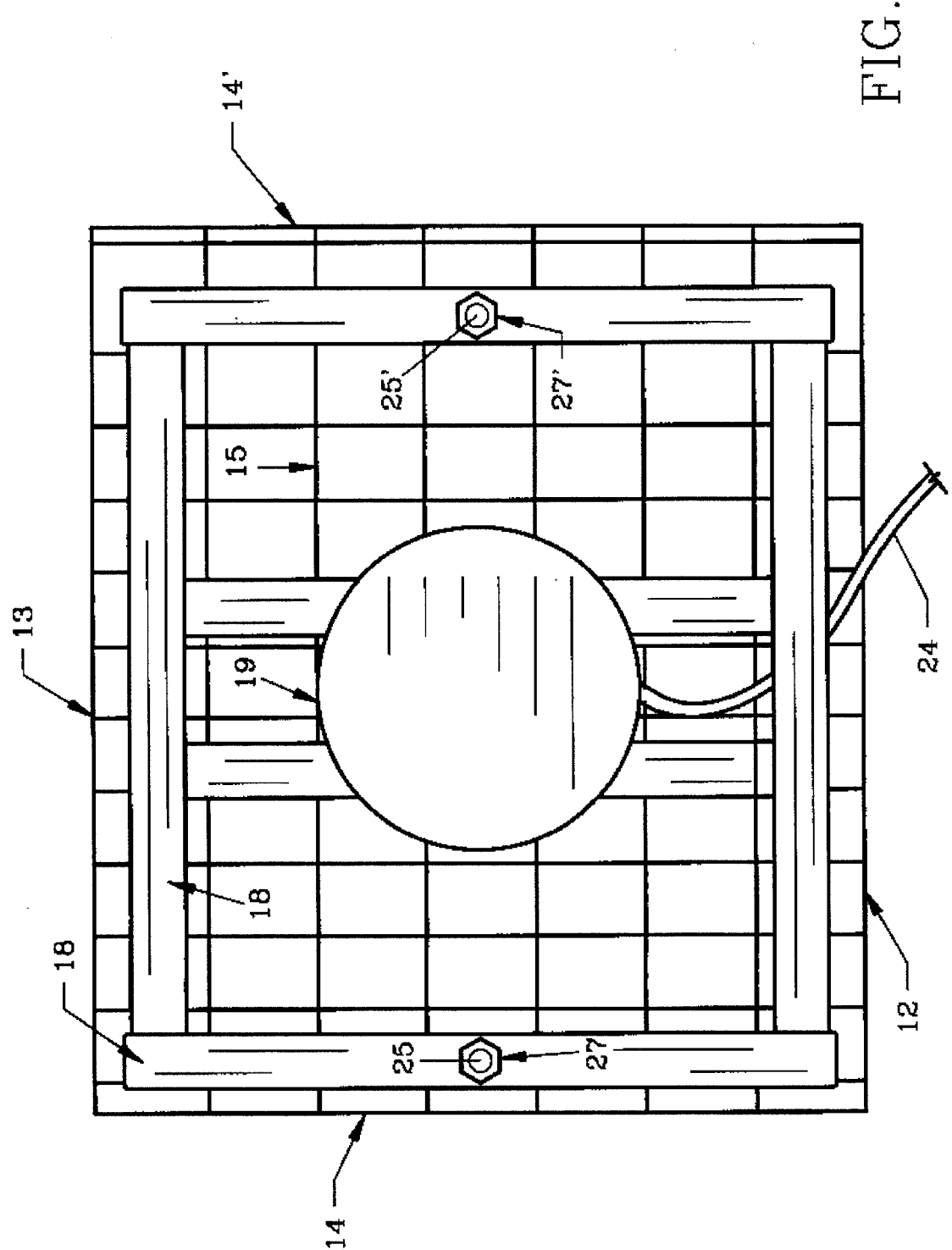

5,542,500

WORKCAR INSERT

BACKGROUND OF THE INVENTION

1. Field Of The Invention

The invention herein pertains to a cart and particularly to a wheeled workcart which includes a movable platform which is pneumatically operated to raise or lower objects contained within the cart for ease in handling.

2. Background And Objectives Of The Invention

Various types of containers or carts which are wheeled or slidable have long been used in factories and other manufacturing facilities for storage, transportation and handling of small objects and parts. It is not unusual during fabrication for many parts to be operated on at two or more workstations before completion. At each station, operators have little trouble and concern when lifting most small workpieces from a cart or container which is substantially full. However, as the cart is emptied, workers often strain and physically extend their back and arms to reach parts which are at the bottom of the cart. Such bending, extending and straining has oftentimes resulted in serious back injuries causing worker's compensation claims, medical bills and loss of work time by the employee. To remedy this problem various kinds of material handling devices have been conceived having lifting mechanisms including manual, spring, electric and air operated lift tables, hydraulic tilters, carts, lift trucks, tilting stations, stands and the like. However, various containers and standard wire sided wheeled carts are still in existence by the thousands throughout United States factories due to their low cost and general suitability for many manufacturing operations.

Thus, with the current background, practices and concerns of manufacturers in mind, the present invention was conceived and one of its objectives is to quickly, readily transform a conventional container into an automated, more convenient ergonomically correct workstation for handling various objects and parts.

It is another objective of the present invention to provide a container which includes a platform mechanism which can be pneumatically operated at a workstation.

It is still another objective of the present invention to provide a workcart by retrofitting a conventional cart with a platform which can be pneumatically raised or lowered as desired to an infinite variety of convenient heights.

It is yet another objective of the present invention to provide a workcart having a pneumatically operated platform driven by an air bellows which is relatively inexpensive to manufacture and can be easily adjusted by unskilled workers.

Various other objectives and advantages of the present invention will become apparent to those skilled in the art as a more detailed description is set forth below.

SUMMARY OF THE INVENTION

The aforesaid and other objectives can be realized by providing a conventional wheeled wire sided workcart with a pneumatic mechanism having a base frame and movable platform affixed thereto. The base frame provides a plurality of extending vertical rods upon which a planar platform is slidably positioned. A conventional convoluted pneumatic bellows is affixed between the platform and the frame and a three-way control valve conveniently, releasably positioned on the cart allows the operator to inflate and deflate the bellows as needed, respectively raising and lowering the platform to the desired height. Thus, a worker can adjust the platform height to any of a variety of selected positions for ease in filling or emptying the workcart as required.

BRIEF DESCRIPTION OF THE DRAWINGS

FIG. 3 provides a top view of the workcart as shown in FIG. 1 with the platform removed to better view the frame.

DETAILED DESCRIPTION OF THE PREFERRED EMBODIMENT AND OPERATION OF THE INVENTION

Figure 1:
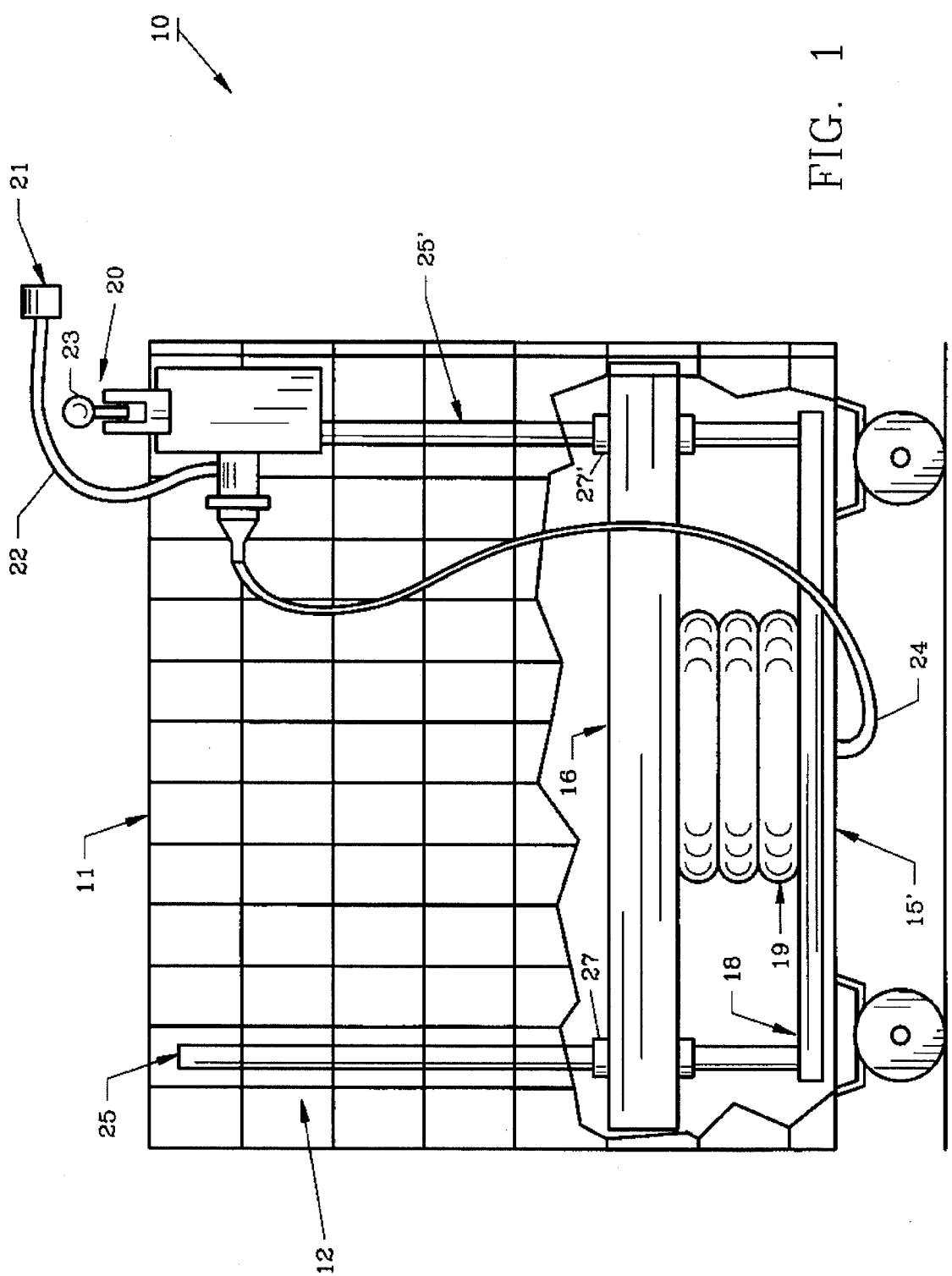
FIG. 1 illustrates a cut-away side view of a conventional workcart having the pneumatic mechanism of the invention therein.
Figure 2:
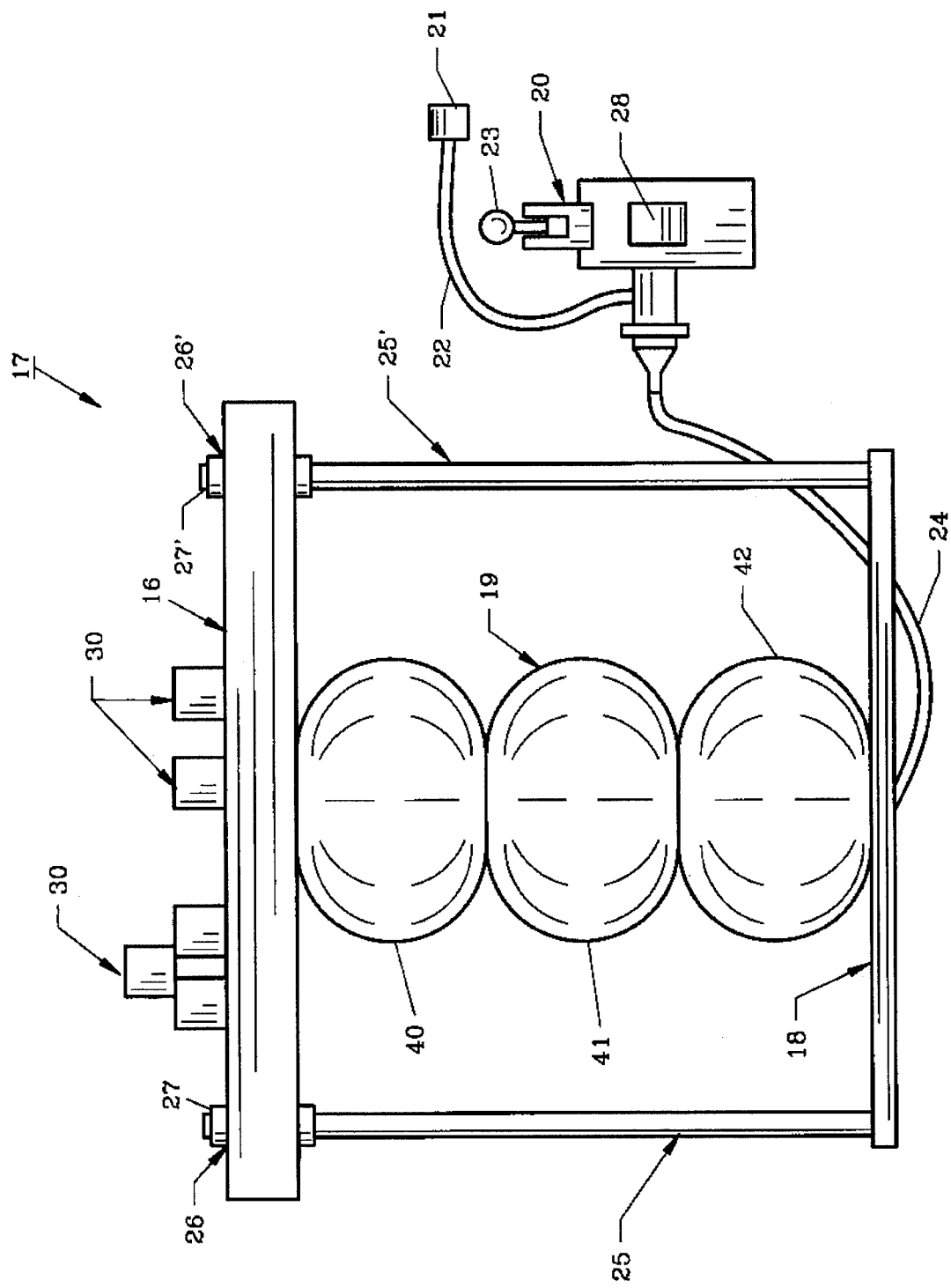
FIG. 2 demonstrates a side elevational view of the pneumatic mechanism removed from the workcart.

For a better understanding of the invention and its operation, turning now to the drawings, FIG. 1 demonstrates workcart 10, the preferred embodiment of the invention which includes a conventional wire sided cart 11 having front wire wall 12 as shown in FIG. 3, rear wire wall 13, wire bottom 15 and side wire walls 14, 14' to form a rectangular "cage" to maintain work parts 30 or other objects therein for ease and convenience in handling. Other types of carts or containers of various dimensions may likewise be used as required for particular purposes. As further seen in FIG. 2, work parts 30 may include metal fabricated parts or any of a variety of objects which can be stacked on planar platform 16 as needed. Pneumatic mechanism 17 as shown in FIG. 2 shows the preferred mechanism removed from cart 11 which is constructed to automate cart 11 and includes a rectangular base frame 18 which may be formed of thin steel, angle iron or the like for positioning along bottom 15, inside of cart 11 where it can be secured thereto or not, as necessary. Positioned on base frame 18 as seen in FIG. 2 is a conventional "air spring" or pneumatic bellows 19 which, with sufficient air pressure, expands vertically along its three convolutions (40, 41 and 42) and acts as a means to move platform 16 vertically, to which it is also attached. The height of bellows 19 (and platform 16) is adjustable by manual three-way control valve 20 affixed to front wall 12 of cart 11 by clip 28 and may have a fully extended height of approximately sixteen inches.

To operate platform 16, air is allowed to pass from an air supply (not shown) such as a compressor, storage tank or the like which is joined by quick coupling 21 to air supply line 22. Air supply line 22 allows air under pressure to flow to standard manually operated three-way control valve 20 which is attached by metal clip 28 to cart 11. As desired, lever 23 can be moved forward or rearward as shown in FIG. 1 to cause platform 16 to move respectively, upwardly or downwardly. Upon release, lever 23 returns to a neutral position by spring action. When lever 23 is moved forward, air moves along supply line 22 through air line 24 and into pneumatic bellows 19. As pneumatic bellows 19 expands, platform 16 is lifted as shown in FIG. 2. In order to insure that platform 16 maintains an even, horizontal posture within cart 11, two vertical stabilizing rods 25, 25' are affixed to frame 18. Stabilizing rods 25, 25' may be for example, three-quarters to one inch in diameter and extend to substantially the top of walls 12, 13, 14, 14' of cart 11. As would be understood, platform 16 includes a pair of apertures 26, 26' with sleeves 27, 27' having bushings for ease in sliding as shown in FIG. 2 for receiving stabilizing rods 25, 25' respectively therethrough.

In recent years employers have been particularly concerned with the health of their employees and in preventing the nation's number one workplace safety problem according to the U.S. Department of Labor, back problems caused by lifting heavy objects. The present invention helps eliminate excessive bending and lifting since objects 30 as shown in FIG. 2 can be lifted to selected convenient heights for the particular worker as he removes or replaces parts 30 within workcart 10.

In use, workcart 10 is manually rolled to a desired position for example, beside a first drill press workstation in a factory. As the drill press operator completes fabrication on a particular part, he places it on platform 16 which has been raised by use of three-way control valve 20 to a convenient height. Once platform 16 has been completely covered with parts 30, it can then be lowered and another layer of parts 30 placed atop the first. This process continues until platform 16 is lowered as far as possible contiguous with base frame 18 and workcart 10 full. At that time air supply line 22 is disconnected from the air pressure source by releasing quick coupling 21 and workcart 10 can then be rolled to a second location and replaced at the first workstation with a second empty workcart 10. At the second location the workstation operator can reconnect quick coupling 21 on workcart 10 to an air source, remove parts 30 as required while raising or lowering platform 16 by control valve 20 to obtain a convenient height during use. During the lowering of platform 16, air from pneumatic bellows 19 is released through valve 20 as would be understood by those knowledgeable in the art. Pneumatic mechanism 17 can be easily, manually lifted by one employee from cart 11 and placed in another similar cart without special tools or undue effort as desired.

The illustrations and examples provided herein are for explanatory purposes and are not intended to limit the scope of the appended claims.

I claim:

1. A pneumatically elevatable workcart container insert comprising: a horizontal rectangular bottom frame having four sides, an elevatable platform, a first and a second stabilizing vertical rod, said first stabilizing vertical rod attached to the midpoint of a side of said horizontal rectangular frame, said second stabilizing vertical rod attached to the midpoint of the side of said horizontal rectangular frame opposite said first stabilizing vertical rod, said elevatable platform slidably affixed to said first vertical rod and said opposing second vertical rod for movement therealong with said elevatable platform positioned above said horizontal rectangular frame, a pneumatic bellows, said pneumatic bellows mounted on said frame and attached to said elevatable platform wherein said elevatable platform is elevated by inflating said pneumatic bellows.

2. The pneumatically elevatable workcart container insert of claim 1 and including a platform controller, said controller connected to said pneumatic bellows.

3. The pneumatically elevatable workcart container insert of claim 2 wherein said elevatable platform is planar.

4. The pneumatically elevatable workcart container insert of claim 1 wherein said horizontal rectangular bottom frame is planar.

5. The pneumatically elevatable workcart container insert of claim 2 wherein said controller comprises a lever operated valve.

6. A pneumatically elevatable workcart insert for placement in a workcart container to lift objects placed therein comprising: a horizontal rectangular frame, said frame for positioning along the bottom inside of said workcart container, a pair of stabilizing rods protruding vertically upward from said frame, said rods protruding from opposing rectangular side midpoints, a platform, said platform slidably positioned on said stabilizing rods above said frame, and a pneumatic bellows, said pneumatic bellows joined to said platform and to said frame.

7. The pneumatically elevatable workcart insert of claim 6 and including a platform controller, said controller communicating with said pneumatic bellows.

\* \* \* \* \*